Feb. 14, 1939.  E. E. HEWITT  2,147,298
BRAKING APPARATUS
Filed March 24, 1934  6 Sheets-Sheet 1

INVENTOR
ELLIS E. HEWITT
BY
Wm. M. Cady
ATTORNEY

Feb. 14, 1939.  E. E. HEWITT  2,147,298
BRAKING APPARATUS
Filed March 24, 1934  6 Sheets-Sheet 4

INVENTOR
ELLIS E. HEWITT
BY Wm. N. Cady
ATTORNEY

INVENTOR
ELLIS E. HEWITT
ATTORNEY

Patented Feb. 14, 1939

2,147,298

UNITED STATES PATENT OFFICE 2,147,298

BRAKING APPARATUS

Ellis E. Hewitt, Edgewood, Pa., assignor to The Westinghouse Air Brake Company, Wilmerding, Pa., a corporation of Pennsylvania Application March 24, 1934, Serial No. 717,213

22 Claims. (Cl. 303—24)

This invention relates to braking apparatus, and in particular to braking apparatus for high speed, traction vehicles and railway trains.

In trains and traction vehicles designed for high speed service, it is essential that a braking equipment be provided which combines a high order of reliability and safety with simplicity of operation. It is a principal object of this invention to provide an equipment of this character which is particularly adapted for high speed train and vehicle service.

Another object of the invention is to provide a braking equipment in which applications of the brakes may be effected by straight air operation, or by automatic operation.

A yet further object of the invention is to provide an equipment in which a lap condition of the brakes is automatically effected in accordance with a desired degree of braking.

A still further object is to provide a braking equipment in which the rate of retardation is limited automatically by a retardation controller, which provides for a higher rate of retardation during emergency applications of the brakes than during service applications.

Among other objects of the invention are the provision of means for effecting fast application and release of the brakes, the inclusion of certain safety features, and means for effecting an application of the brakes from several points throughout a train.

Other and more specific objects will be apparent from the following description, which is taken in connection with the attached drawings, wherein, Figs. 1 and 1-A, taken together, illustrate one embodiment of my invention.

Fig. 13 is a view along the line 13—13 of the backing-up valve device shown to the right in Fig. 1-A.

Figure 1:
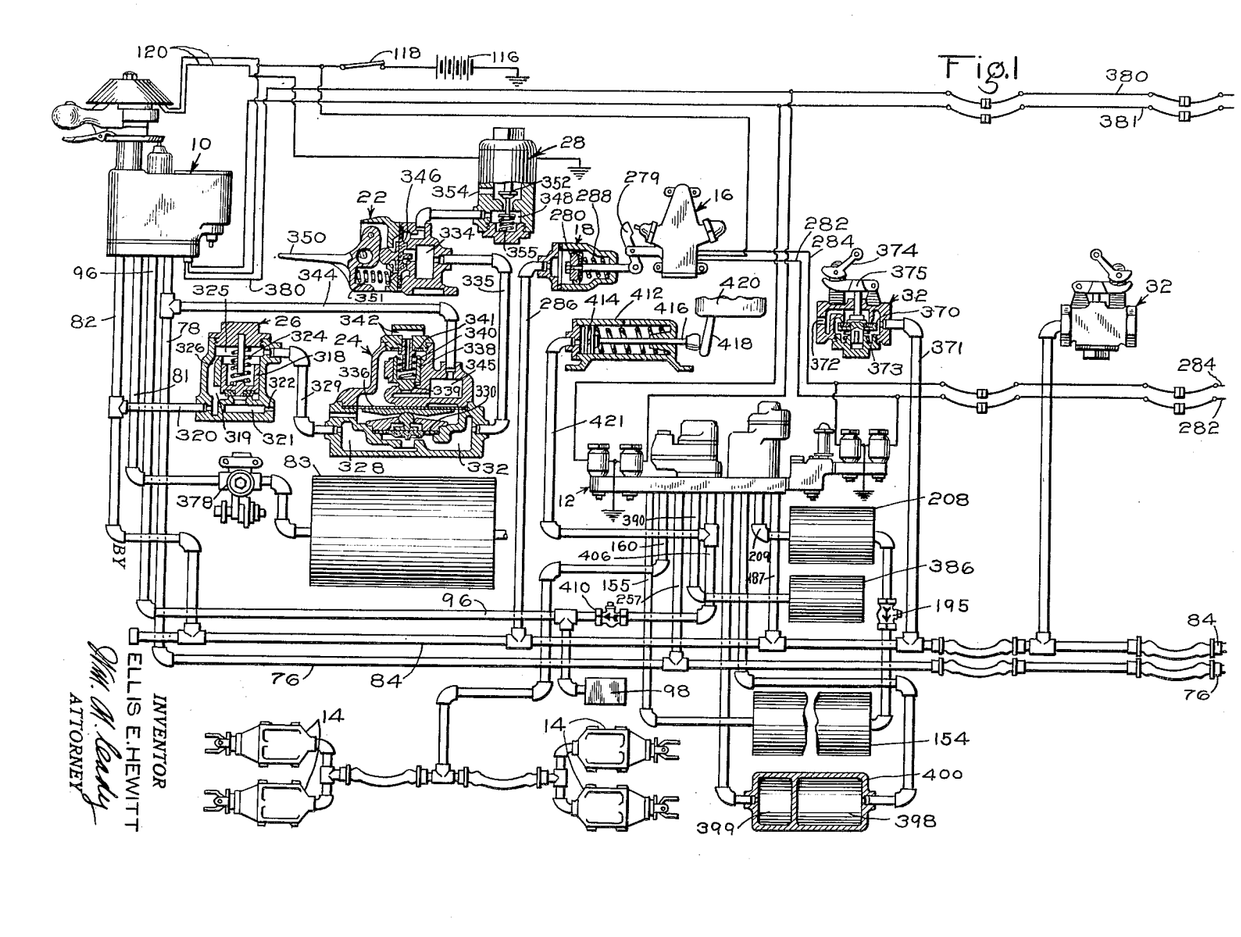

In Figs. 1 and 1-A, taken together, the embodiment has been illustrated in connection with a five car unit articulated type of train. In this type of train one truck serves to support the adjacent ends of two units in the train, so that for the five units there will be six trucks. The first truck will be located under the front end of the first car, the second truck under the articulation between the first and second cars, the third truck under the articulation between the second and third cars, the fourth truck under the articulation between the third and fourth cars, the fifth truck under the articulation between the fourth and fifth cars, and the sixth truck under the rear end of the fifth car.

Each truck will be provided with a brake cylinder for each axle, so that if there are two axles per truck there will be two brake cylinders for each truck.

Since certain of the trucks are common to two car units, brake control equipment need be provided only on every other unit, as is indicated in Figs. 1 and 1-A. In these two figures the separation between car units is indicated by the hose connections between sections of the pipe extending throughout the train, and the distribution of apparatus throughout the train will, therefore, be apparent from observing these separations.

Considering briefly at first the embodiment of the invention shown in Figs. 1 and 1-A, taken together, a brake valve device 10 is provided on the first or head end car for controlling both service and emergency applications of the brakes. On each odd numbered unit in the train there is provided a control valve device 12, which is adapted to control the supply of fluid under pressure to and its release from brake cylinders 14 on each pair of trucks.

For limiting the rate of retardation produced by application of the brakes, there is provided on the head end car a retardation controller device 16. An operating cylinder 18 is provided to adjust the setting of the retardation controller according to whether a service application or an emergency application of the brakes is made.

In order to effect fast applications of the brakes when an emergency application is made, there is provided on the third unit in the train a brake pipe vent valve device 20.

In order to incorporate the well known "dead-man" feature in the equipment, there has been provided on the head end car a foot valve device 22, a cut-off valve device 24, an application valve device 26, and a magnet valve device 28.

To provide for effecting an application of the brakes from the rear end of the train when backing up, there is included a backing-up valve and whistle device 30, located on the rear end of the last car in the train.

In order that an application of the brakes may be effected from any unit in the train in emergency cases, there is provided on each unit a conductor's valve device 32.

Figures 2, 3, 4, 5, 6, 7, 8:
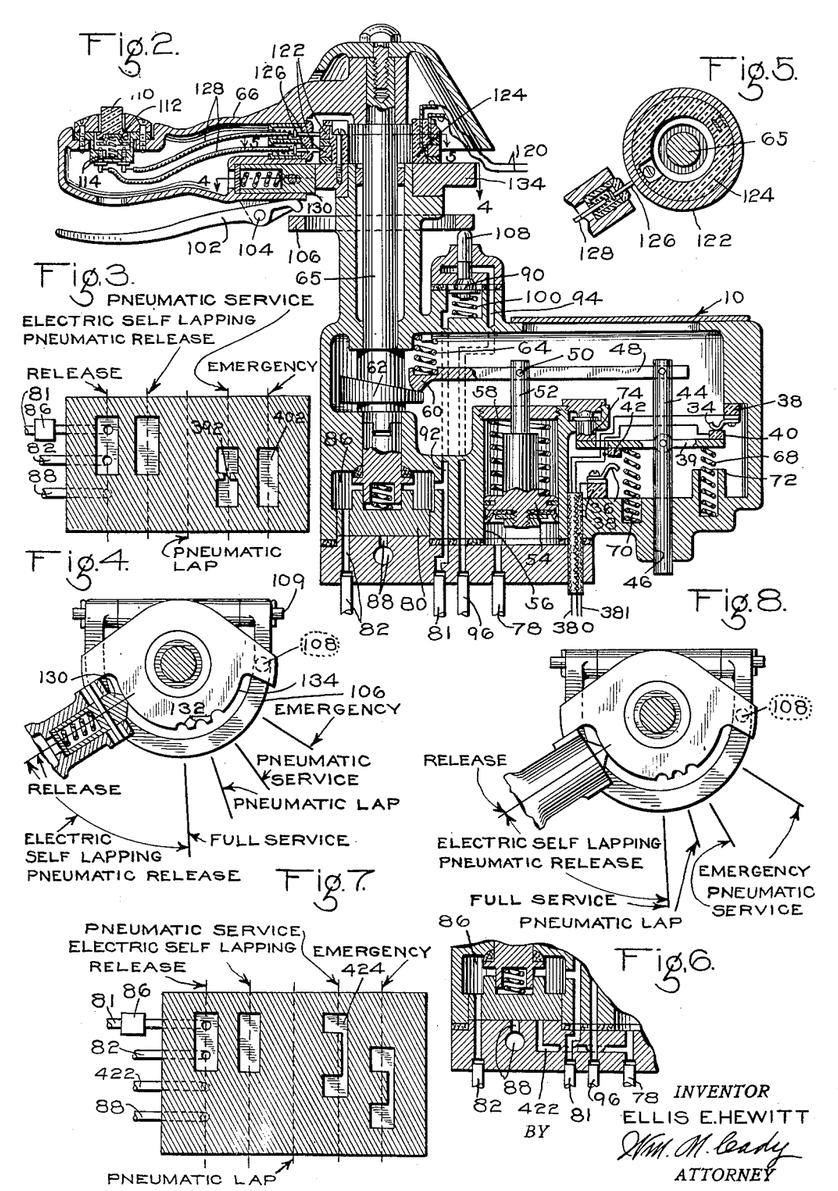
Fig. 2 is a diagrammatic, sectional view of one form of brake valve device which may be used in connection with the embodiment shown in Figs. 1 and 1-A.
Fig. 3 is a diagrammatic development of the rotary valve portion of the brake valve device shown in Fig. 2.
Fig. 4 is a view along the line 4—4 of Fig. 2.
Fig. 5 is a view along the line 5—5 of Fig. 2.
Fig. 6 shows in diagrammatic form a modification of the rotary valve portion of the brake valve device shown in Fig. 2.
Fig. 7 is a diagrammatic development of this modified form of rotary valve portion.
Fig. 8 is a top plan view showing the quadrant of this modified form of brake valve device.

Considering now more in detail the apparatus comprising the embodiment shown, the brake valve device 10 may comprise an electric self-lapping portion, for controlling normal service applications, and a rotary valve portion for controlling auxiliary service and regular emergency applications, as shown in Fig. 2.

The electric self-lapping portion is provided with stationary contacts 34 and 36, secured to and insulated from the casing embodying the brake valve device by insulating members 38.

Carried on a contact carrying member 39 are movable contacts 40 and 42, the former being adapted to contact with stationary contact 34 and the latter being adapted to contact with stationary contact 36.

For actuating the contact carrying member 39, there is provided a guiding and actuating member 44, which has one end thereof slidably interfitting with a bore 46 in the brake valve casing, and which has its other end pivotally secured to one end of an operating lever 48.

Intermediate its ends the operating lever 48 is pivotally mounted at 50 to a piston rod 52, which is secured to a piston 54 disposed in a piston chamber 56, and which provides a movable fulcrum for the operating lever. The piston 54 is urged downwardly in the piston chamber by a spring 58.

The other end of the operating lever 48 is provided with a rounded portion 60 which bears upon a cam 62 under pressure of a spring 64. The cam 62 is secured to an operating shaft 65, which is adapted to be rotated by a brake valve handle 66. The cam 62 is provided with a sloping face and when the rounded portion 60 of the operating lever 48 is in engagement with the low portion of the cam, which corresponds to release position of the brake valve handle 66, springs 68 and 70 urge the contact carrying member 39 upwardly to cause movable contacts 40 to engage stationary contact 34. In this position movable contact 42 is out of engagement with stationary contact 36.

When the springs 68 and 70 urge the contact carrying member 39 upwardly, the operating lever 48 fulcrums about the end 60, and raises the piston 54 to an upper position where further movement is opposed by the spring 58, which is of greater resistance than the combination of springs 68 and 70.

When the brake valve handle 66 is rotated, the cam 62 is also rotated to raise the rounded end 60 of the operating lever 48. The other end of the operating lever thereby actuates the contact carrying member 39 downwardly, to first cause the right end of the contact carrying member 39 to disengage movable contact 40 from stationary contact 34 against opposition of spring 68, which is to be understood as offering less resistance than spring 70. This end of the contact carrying member 39 moves downwardly until it engages a stop 72, which provides a fulcrum point, and further downward pressure on the contact carrying member causes the left end carrying contact 42 to next move away from an upper stop 74 downwardly against resistance of spring 70 until movable contact 42 has engaged stationary contact 36.

The reverse of this operation of the movable contacts 40 and 42 may be accomplished by supplying air to the piston chamber 56 beneath the piston 54. When fluid under pressure is supplied to the piston chamber 56, the piston 54 is actuated upwardly and the operating lever 48 fulcrums at its rounded end 60, on the cam 62, to first disengage movable contact 42 from stationary contact 36, and if the pressure below piston 54 is great enough to subsequently cause engagement of movable contact 40 with stationary contact 34. The contact carrying member 39 has its left end, carrying movable contact 42, urged upwardly against stop 74 by spring 70, before its right end, carrying movable contact 40, is urged upwardly by spring 68 into engagement with the stationary contact 34.

The piston chamber 56 is in communication with a straight air pipe 76, which extends throughout the train, by way of pipe 78. The purpose of the electric self-lapping portion of the brake valve device will appear presently.

The rotary valve portion of the brake valve device is provided with a rotary valve 80, which is adapted to control communication between a chamber 86, which connects with a main reservoir 83 by way of passage 92 and pipe 81, and a brake pipe 84, by way of pipe and passage 82, as well as between the brake pipe and a port and passage 88 leading to the atmosphere. The rotary valve 80 is adapted to be actuated by the operating shaft 65 upon movement of the brake valve handle 66.

The brake valve device is also provided with a sanding valve 90, for controlling the supply of fluid under pressure from the passage 92, leading to the main reservoir 83, to a passage 94 connecting with a sanding pipe 96 leading to a sanding device 98 on the head end car.

The sanding valve 90 is urged toward seated position by a spring 100, and is adapted to be unseated by operation of a hand lever 102, pivotally mounted at 104 under the brake valve handle 66. When the long end of the hand lever 102 is moved upwardly, the short end thereof engages a bail 106 to actuate it downwardly, whereupon it urges stem 108 of the sanding valve 90 downwardly to unseat the valve.

As is more clearly shown in Fig. 4, the bail 106 is pivotally mounted at 109 and may be actuated downwardly for any position of the brake valve handle 66. The bail is normally held in its uppermost position by action of the sanding valve spring 100.

For controlling operation of the aforementioned magnet valve device 28, which forms part of the "dead-man" safety apparatus, there is provided in the brake valve handle 66 a switch device comprising a push button 110, which when depressed actuates a spring opened contact member 112 to bridge contacts 114. Bridging of contacts 114 completes a circuit to the magnet valve device 28 from a source of current supply, such for example, as a battery 116, through a switch 118, conductors 120, stationary rings 122, which are supported by and insulated from the brake valve casing by an insulating member 124, and brushes 126 connecting with the contacts 114 by way of cable 128.

Also carried by the brake valve handle 66 is a spring pressed plunger 130, which is adapted to engage notches 132 in a quadrant ring 134, to indicate certain positions of the brake valve handle, as is shown in Fig. 4.

The modifications shown in Figs. 6, 7 and 8 of the brake valve device will be considered later.

Figures 9, 12:
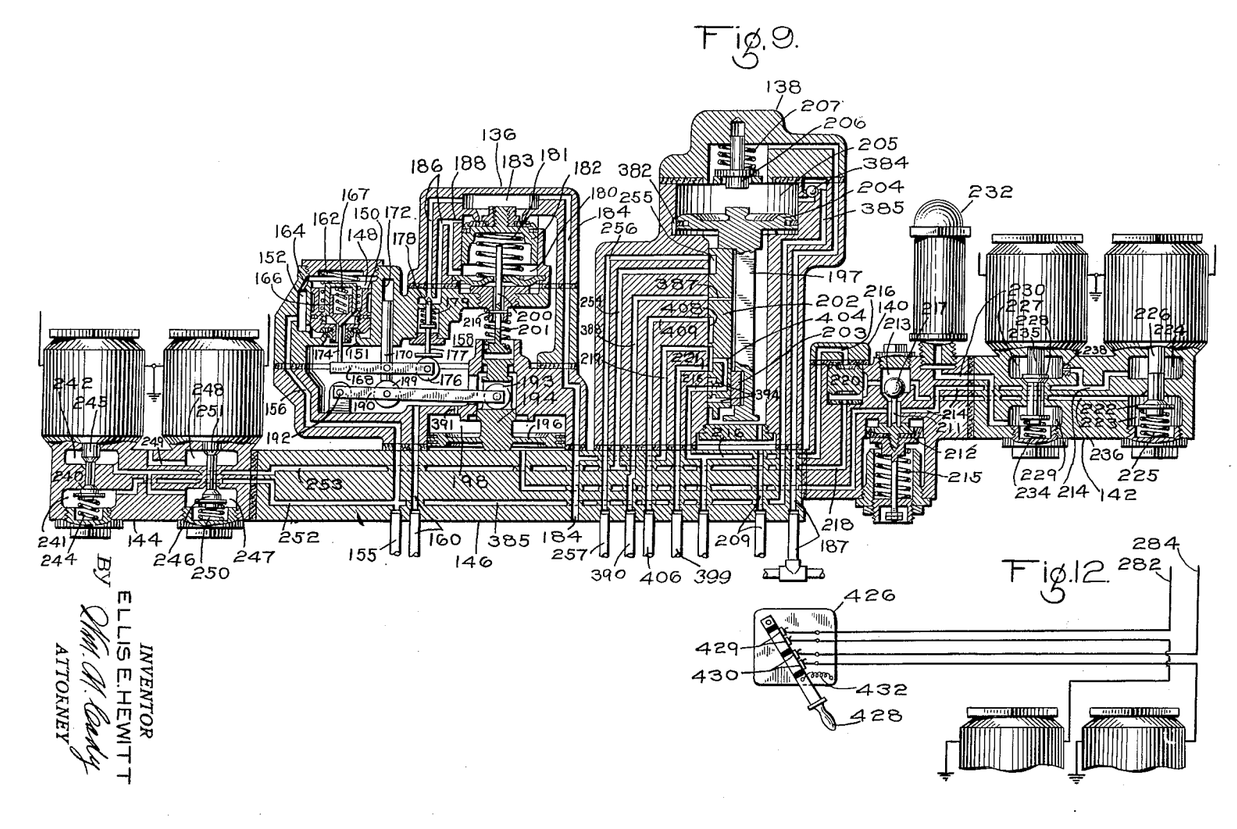
Fig. 9 is a diagrammatic, sectional view of one of the control valve devices shown in both Figs. 1 and 1-A.
Fig. 12 is a partial wiring diagram, showing a modified method of connecting the retardation controller device to certain of the magnet valve devices in the control valve device of Fig. 9.

Each of the control valve devices 12 comprises a relay valve section 136, a triple valve section 138, an inshot valve section 140, a right hand magnet valve section 142, a left hand magnet valve section 144, and a pipe bracket section 146.

The relay valve section 136 is provided with an application valve chamber 148, in which is disposed an application valve 150 adapted to control the supply of fluid under pressure from a supply chamber 152, which connects with an associated supply reservoir 154 through a pipe 155 and passage 156, and a pressure chamber 158 connecting with a group of four brake cylinders 14, by way of pipe and passage 160.

The application valve 150 is urged toward a seat 151 by a spring 162. The valve chamber 148 is connected with the supply chamber 152 by a restricted port 164, so that when the pressures in the two chambers are substantially equal the application valve is held seated by the spring 162.

Slidably disposed within the application valve 150 is an application pilot valve 166. The pilot valve is urged toward a pilot valve seat in the application valve by a spring 167. When the pilot valve 166 is unseated, fluid pressure is released from the application valve chamber 148 to the pressure chamber 158 faster than it can be replenished through the restricted port or orifice 164, so that the overbalancing pressure on the under side of the application valve unseats it to permit fluid under pressure to flow from the supply chamber 152, and the supply reservoir 154, to the pressure chamber 158, and from thence to the connected brake cylinders 14.

For unseating the application pilot valve 166, there is provided a mechanism including spaced levers 168, loosely carried intermediate their ends by a pivot carrier 170 slidably interfitting with a bore 172 in the relay valve section casing.

Between the adjacent ends of the spaced levers 168, to one side of the floating pivot carrier 170, is held a rod 174 adapted to engage the pilot valve 166 to unseat it when the pivot carrier 170 is actuated upwardly.

Between the other adjacent ends of the spaced levers 168 is rotatably held a roller 176, which is adapted to engage a stem 177 of a release pilot valve 178, which is urged to unseated position by a spring 179, for a purpose which will appear presently.

Relay valve section 136 is also provided with a release valve chamber 180 in which is disposed a release valve 182. The release valve 182 is adapted to control the release of fluid pressure from the pressure chamber 158 to the atmosphere, by way of exhaust chamber 183 and passage 184.

The heretofore mentioned release pilot valve 178 is disposed in a passage 186 connecting the release valve chamber 180 with exhaust chamber 183 leading to the atmosphere. The portion of the passage 186 between the release pilot valve and the valve chamber 180 connects with the pressure chamber 158 through a restricted orifice 188.

When the release pilot valve 178 is unseated, pressure is released from the release valve chamber 180 to the atmosphere faster than it can be supplied from pressure chamber 158 to the valve chamber through the restricted orifice 188, so that the pressure in the pressure chamber 158 acts upon the under side of the release valve 182 to unseat it, thereby permitting fluid pressure in the pressure chamber 158 to be released to the atmosphere by way of exhaust chamber 183 and passage 184.

For actuating the pivot carrier 170, to operate the application pilot valve 166 and the release pilot valve 178, there is provided spaced operating levers 190, which have one end thereof secured to a fixed pivot 192 and in the other end thereof secured a roller 193 disposed in a slot in a stem 194 associated with a piston 196 operatively mounted in a piston chamber 198.

Intermediate the ends of the operating levers 190 is rotatably secured another roller 199, which is adapted to engage the lower end of the pivot carrier 170.

When fluid under pressure is supplied to the piston chamber 198, beneath the piston 196, the operating levers 190 are moved upwardly about the fixed pivot 192, so that the pivot carrier 170 is actuated to first seat the release pilot valve 178 and to subsequently unseat the application pilot valve 166, the release pilot valve spring 179 being lighter than the application pilot valve spring 167.

When the piston 196 is moved upwardly, it engages a plunger 200 after a short movement and forces it upwardly against resistance of a spring 201 to seat the release valve 182 in case its spring 181 has failed to seat it.

The triple valve section 138 is provided with a slide valve 202 and a graduating valve 203, for controlling connections between passages as will appear presently.

For operating the slide valve 202 and the graduating valve 203, there is provided a piston 204 operatively mounted in a piston chamber 205, and having a stem 197 for engaging the slide valve and graduating valve. The piston chamber 205 is in open communication with the brake pipe 84 through pipe and passage 187.

When the piston 204 is in its lowermost position, the slide valve 202 is in release position. When the piston 204 is actuated upwardly to engage a graduating stem 206, but does not compress a graduating spring 207 urging the graduating stem downwardly, it has moved the slide valve 202 to service position.

When the piston 204 has compressed the graduating spring 207 until the piston engages the upper wall of the piston chamber 205, the slide valve 202 is in emergency position.

The slide valve chamber of the triple valve section 138 is connected to an auxiliary reservoir 208 by a pipe and passage 209. Each auxiliary reservoir 208 is connected with each supply reservoir 154 by a pipe having a check valve 195 therein, which is adapted to permit fluid to flow from the auxiliary reservoir to the supply reservoir, but preventing back flow. The full purpose of this check is more fully set forth hereinafter.

When the slide valve 202 is in release, service or emergency position, connections are made between the auxiliary reservoir and connected apparatus, and between other reservoirs and other connected apparatus, as will hereinafter more fully appear.

The inshot valve section 140 has provided therein a valve chamber 213 in which is disposed a ball valve 217 carried on a stem 211 of a piston 212. The ball valve 217 is adapted to control the flow of fluid from the valve chamber 213 to a passage 214 beneath the ball valve seat.

The ball valve 217 is urged toward unseated position by a spring 215 acting upon the piston 212 urging it upwardly to unseat the valve. The valve is urged to seated position by action of a predetermined fluid pressure on the upper side of the piston 212, which pressure overcomes resistance of the spring 215 to seat the valve.

The valve chamber 213 may communicate with either a passage 216 or a passage 218 through action of a double check valve 220, the purpose of which will appear presently.

The right hand magnet valve section 142 is provided with a cut-off valve 222, which is adapted to control the flow of fluid from a valve chamber 223 to an uuper chamber 224.

The cut-off valve 222 is urged toward seated position by a spring 225, and to unseated position by action of an electro-magnet in the upper part of the casing, which when energized actuates a stem 226 downwardly to unseat the valve.

The right hand magnet valve section 142 is also provided with a release valve 228 adapted to control the flow of fluid from a valve chamber 227 to a release chamber 229 leading to the atmosphere by way of passage 230 and a safety valve device 232, which may be of any of the usual types commonly employed.

The release valve 228 is urged toward unseated position by a spring 234 and to seated position by action of an electromagnet in the upper part of the casing, which when energized actuates a stem 235 downwardly to seat the valve.

The right hand magnet valve section 142 controls the flow of fluid in a by-pass path around the inshot ball valve 217. The cut-off valve chamber 223 is in communication with the inshot valve chamber 213 by a passage 236, while the upper chamber 224 is in communication with the aforementioned passage 214, so that when the cut-off valve 222 is in unseated position fluid may flow around the inshot valve 217 to the cut-off valve chamber 223, past the unseated cut-off valve 222, to the upper chamber 224, and thence through the passage 214 to piston chamber 198, beneath piston 196, in the relay valve section 136.

It will be obvious that when the inshot ball valve 217 is in unseated position a path to the relay valve piston chamber 198 is afforded both past the unseated ball valve 217 and past the unseated cut-off valve 222. When the ball valve 217 is seated, fluid can only flow to the relay piston chamber past the unseated cut-off valve 222.

When the release valve 228 is unseated, fluid under pressure supplied to the relay piston chamber 198 by way of this path may be released to the atmosphere past the unseated release valve and through the safety valve device 232, a choke 238 being provided to restrict the rate at which fluid flows to the atmosphere.

The left hand magnet valve section 144 is provided with an application valve 240, which is adapted to control the flow of fluid from a valve chamber 241 to an upper chamber 242. The valve 240 is urged toward seated position by a spring 244, and to unseated position by an electro-magnet in the upper part of the casing, which when energized actuates a stem 245 downwardly to unseat the valve.

The left hand magnet valve section is also provided with a release valve 246, which is adapted to control the release of fluid pressure from a valve chamber 247 to an upper chamber 248, which is in communication with the atmosphere by way of a passage 249.

The release valve 246 is urged toward seated position by a spring 250, and to unseated position by an electro-magnet in the upper part of the casing, which when energized actuates a stem 251 downwardly to unseat the valve.

The application valve chamber 241 is in communication with the connected supply reservoir 154 by way of pipe 155 and passage 252, so that when the application valve 240 is in unseated position, fluid under pressure may flow from the supply reservoir 154 to the application valve chamber 241, and past the unseated valve 240, to upper chamber 242, from whence it may flow to both the relay piston chamber 198 and to the straight air pipe 76.

The path to the straight air pipe 76 is by way of passages 253 and 254, cavity 255 in the triple valve slide valve 202, passage 256, and pipe 257.

The path to the relay piston chamber 198 is by way of passages 253 and 218, past the double check valve 220, which is forced to its upper position, inshot valve chamber 213, past the unseated ball valve 217, and through passage 214.

As heretofore indicated, the flow may be around the inshot valve 217, through passage 236, past the unseated cut-off valve 222, to the upper chamber 224, from whence it flows to the piston chamber 198 through passage 214.

The supply of fluid under pressure to the relay piston chamber 198 and the straight air pipe 76 is cut off when the application valve 240 is seated. The supply of fluid to the piston chamber 198 may be also cut off when the cut-off valve 222, in the right hand magnet valve section, and the inshot valve 217 are seated, but the supply to the straight air pipe is not cut off when these latter valves only are seated.

When the release valve 246 is in unseated position, fluid pressure is released from both the relay piston chamber 198 and the straight air pipe 76. Fluid pressure may also be released from both the relay piston chamber 198 and the straight air pipe 76 when the release valve 228 in the right hand magnet valve section is unseated.

The purpose and the functioning of the control valve device as a whole, will be more fully described hereinafter.

Figure 10:
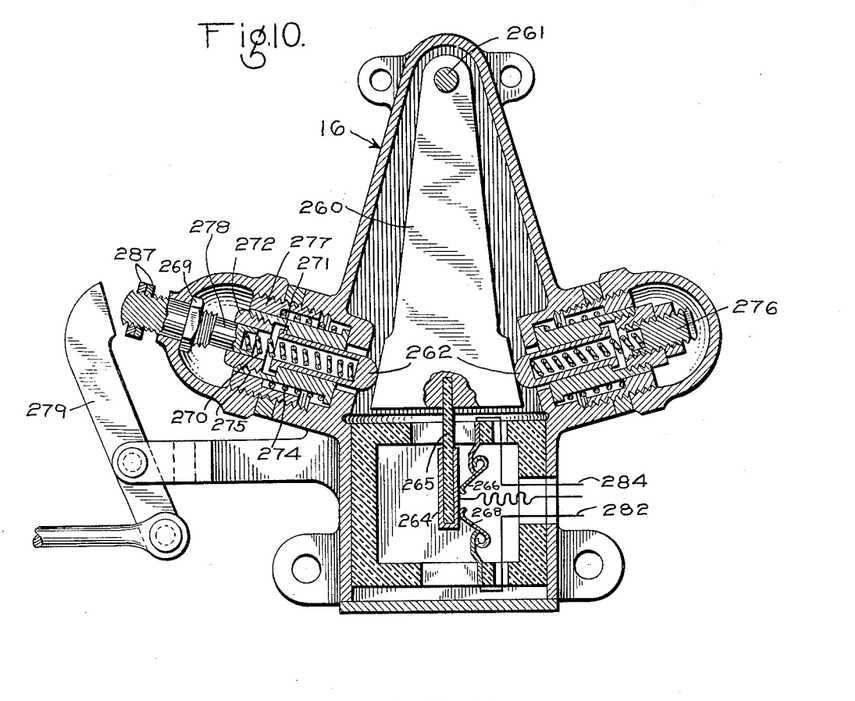
Fig. 10 is a diagrammatic, sectional view of the retardation controller device shown in Fig. 1.

The retardation controller device 16 is embodied in a casing provided with an inertia operated body 260 adapted to swing about a pivot 261, and normally held in a balanced or neutral position by spring pressed plungers 262.

The body 260 carries a contact 264, which is insulated therefrom by an insulating member 265. When the body 260 is in neutral or balanced position, contact 264 is in engagement with resilient and stationary contacts 266 and 268.

The retardation controller is positioned on the head end or control car in a manner such that changes in the rate of speed of the train cause the inertia operated body 260 to swing either to the left or right, movement to the left occurring during deceleration, and movement to the right occurring during acceleration.

Movement in either direction is opposed first by a light spring 270, which yields until flange 271 of plunger 262 engages a stop 272, whereupon further movement of the body 260 is next opposed by a heavy spring 274, which acts upon an outer sleeve member 275 carrying the stop 272. The tension of the right hand light spring 270 may be regulated by a regulating nut 276, while tension of either the right or left heavy spring 274 may be regulated by a regulating sleeve 277.

Fixed tension of the left hand light spring 270 may be regulated by an adjusting nut 269 on a plunger 278, while additional tension may be applied through a lever 279 which connects with a piston 280 in the aforementioned operating cylinder 18.

When the body 260 is caused to swing about its pivot due to speed changes, it will be apparent that for a given tension on the light spring 270, a certain rate of speed change will be required to compress the light spring 270 until the plunger flange 271 engages the stop 272, after which a greater rate of speed change will be required to compress the heavy spring 274.

Figure 11:
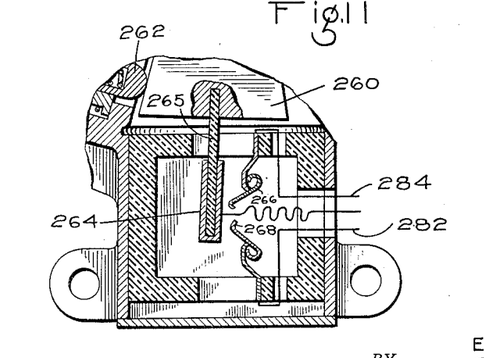
Fig. 11 is a fragmentary sectional view of the retardation controller device shown in Fig. 10, with the contacts in open position.

The contacts 266 and 268 are so arranged that when the body 260 will have compressed the light spring 270 until the flange 271 has engaged stop 272, movable contact 264 will have disengaged from stationary contact 268. Thereafter, when the body 260 will have compressed the heavy spring 274 a given distance, movable contact 264 will have disengaged from stationary contact 266.

Now since the body 260 is caused to be moved by speed changes of the train, it will be apparent that by varying the tension on the light spring 270 different rates of retardation will be required to compress the spring to cause disengagement of contact 264 from contact 268. In a similar manner, by varying the tension on the heavy spring 274 different rates of retardation will be required to cause disengagement of contact 264 from contact 266.

Contact 268 is connected to the electro-magnet in the right hand magnet valve section, of each control valve device 12, which controls the cut-off valve 222, by a conductor 282, which extends throughout the train.

Contact 266 is connected to the electro-magnet controlling the release valve 228 in each control valve device by a conductor 284, which also extends throughout the train. Movable contact 264 is connected to the battery 116, through switch 118. The purpose of this arrangement will appear presently.

The operating cylinder 18, which is adapted to control tension on the left hand light spring 270, is connected to the brake pipe 84 by a pipe 286. With pressure maintained at a normal value in the brake pipe, the piston 280 is forced to the right to maintain the lever 279 out of engagement with the plunger 278. The light spring 270 is thus normally under a fixed tension established by the adjusting nut 269.

When pressure in the brake pipe is reduced, spring 288 in the cylinder 18 urges the piston 280 to the left, causing the lever 279 to engage the plunger 278 to compress the light spring 270 in accordance with the differential of pressure acting on the piston 280, this differential being proportional to the reduction in brake pipe pressure. When pressure in the brake pipe is restored, the additional tension on the light spring 270 due to the lever 279 is released. Adjustable nuts 287 serve to limit the tension which may be placed on the light spring 270.

The brake pipe vent valve device 20 is provided with a quick action valve 290, which is adapted to control local release of pressure from the brake pipe, by way of pipe 291, passage 292, valve chamber 293, and passage 294.

The quick action valve 290 is urged toward seated position by a spring 295, and to unseated position by action of a quick action piston 296, which moves to the left to unseat the quick action valve when fluid under pressure is supplied to piston chamber 298 in which the piston is disposed.

A light spring 299 acts constantly upon the piston 296 to urge it to unseat the quick action valve 290, but the quick action valve is normally held seated by the overbalancing pressure of its spring 295.

The brake pipe vent valve device is also provided with a slide valve 300, for controlling the supply of fluid under pressure to the piston chamber 298 to actuate the piston 296. For actuating the slide valve 300, there is provided an emergency piston 302, operatively mounted in a piston chamber 303.

When pressure in the brake pipe is maintained at a normal value, fluid under pressure will be supplied to the emergency piston chamber 303, by way of pipe 291 and passage 292. Fluid pressure in this chamber actuates the emergency piston 302 to its lowermost position, whereupon slide valve 300 is positioned upon its seat to cut off the flow of any fluid to the quick action piston chamber 298.

Fluid under pressure in emergency piston chamber 303 also flows to a quick action chamber 304 in the brake pipe vent valve device casing, by way of passage 305, past a ball check valve 306, to chamber 307 containing the slide valve 300, which is in communication with the quick action chamber 304 by way of passage 308.

When a service rate of reduction is effected in brake pipe pressure, the pressure above the emergency piston 302 is accordingly reduced and the overbalancing pressure below the piston actuates it upwardly until its graduating stem 310 engages stop 311.

When this takes place slide valve 300 will be positioned to connect slide valve chamber 307 and quick action chamber 304 with the passage 294 leading to the atmosphere, through a restricted port 312 in the slide valve, while the slide valve will continue to blank the passage 309 leading to the quick action piston chamber 298. Quick action chamber pressure will therefore be released to the atmosphere and quick action valve 290 will remain seated.

When an emergency rate of reduction in brake pipe pressure has been effected, emergency piston 302 moves upwardly to compress graduating spring 315, whereupon the slide valve 300 is positioned to connect quick action chamber 304 to quick action piston chamber 298 only, by way of passage 309. Quick action chamber 304, therefore, equalizes to quick action piston chamber 298, to cause quick action valve 290 to be opened wide to locally vent brake pipe pressure to the atmosphere at an emergency rate.

The pressure in both the quick action chamber 304 and emergency piston chamber 298 will eventually be released to the atmosphere through a restricted port 314 in the quick action piston 296, and when this pressure has dropped to a sufficiently low value, spring 295 will seat the quick action valve 290, as before.

When the pressure in the brake pipe has been restored to normal value, piston 302 returns to its lowermost position and the quick action chamber 304 is recharged through the passage 305, past the ball check valve 306, which prevents back flow to the brake pipe from the quick action chamber during an automatic application of the brakes. A restriction 316 is provided in the passage 305 to limit the rate of build-up of quick action chamber pressure.

The application valve device 26 is embodied in a casing having a valve 318, for controlling the release of fluid pressure from a brake pipe chamber 319, which connects with the brake pipe 84 by pipe 320, to an exhaust chamber 321 leading to the atmosphere by way of a port 322.

The valve 318 is urged toward seated position by a spring 324 disposed in a chamber 325 above the valve. The chamber 325 connects with the aforementioned brake pipe chamber 319 through a restricted passageway 326.

When the pressure in chambers 325 and 319 are substantially equal, spring 324 holds the valve 318 upon its seat. When the pressure in chamber 325 is reduced at a rate faster than it can be replenished through the restricted passageway 326, the pressure below the valve will act against resistance of spring 324 to unseat the valve, to permit fluid pressure in the brake pipe chamber 319 to be released to the atmosphere through port 322.

The chamber 325 above the valve 318 is connected to a supply chamber 328 in the cut-off valve device 24, by way of pipe 329. Cut-off valve device 24 is provided with a valve 330, for controlling the flow of fluid under pressure from the aforementioned supply chamber 328 to a release chamber 332 connected with a chamber 334 in the foot valve device 22, by way of pipe 335.

The cut-off valve device is also provided with a diaphragm 336, which is adapted to cause the valve 330 to be seated when pressure above the diaphragm exceeds that acting upon the valve below the diaphragm. Pressure above the diaphragm is controlled by a control valve 338, which is urged toward a lower seat 339 by a spring 340, and toward an upper seat 341 by pressure below the valve.

When the control valve 338 is seated in lower position, the chamber above the diaphragm 336 is in communication with the atmosphere through a passage 342, and past the open upper seat 341. Pressure to operate the diaphragm 336 downwardly is supplied from straight air pipe 76 by way of pipe 344, to a straight air pipe chamber 345.

When the pressure supplied to the straight air pipe chamber 345 reaches a predetermined value, the control valve 338 is actuated from its lower seat 339 to its upper seat 341, to cut off communication with the atmosphere and to permit fluid to flow to the chamber above diaphragm 336.

When the fluid pressure above the diaphragm 336 reaches a predetermined value, the valve 330 will be seated. It will thus be seen that when the pressure in the straight air pipe 76 has reached a predetermined value, the cut-off valve 330 will be held seated.

The foot valve device 22 is embodied in a casing provided with the aforementioned chamber 334 and a valve 346, which is adapted to control the flow of fluid under pressure from the chamber 334 to a chamber 348 in the magnet valve device 28.

The valve 346 is held seated by maintaining pressure on a foot pedal 350, which actuates the valve to seated position. When pressure on foot pedal 350 is released, a spring 351 urges the foot pedal out of engagement with the valve, and pressure in chamber 334 may then unseat the valve and flow past the unseated valve to chamber 348 in the magnet valve device 28.

The magnet valve device 28 is provided with a release valve 352, which is adapted to control the release of fluid pressure from the chamber 348 to the atmosphere by way of port 354.

The valve 352 is urged toward unseated position by spring 355, and toward seated position by an electro-magnet in the upper part of the magnet valve device casing, which when energized actuates the valve 352 downwardly toward seated position.

From the foregoing description of the application valve device 26, the cut-off valve device 24, the foot valve device 22, and the magnet valve device 28, it will be seen that when the magnet valve device 28 is deenergized, when pressure on the foot pedal 350 is released, and when the valve 330 in the cut-off valve device is in unseated position, fluid pressure will be released from the chamber 325 in the application valve device to the atmosphere, and the valve 318 will be then unseated to release fluid pressure from the brake pipe to the atmosphere. This release of fluid pressure from the brake pipe to the atmosphere will take place at an emergency rate, so that an emergency application of the brakes will result, as will hereinafter more fully appear.

Figures 1, 13:
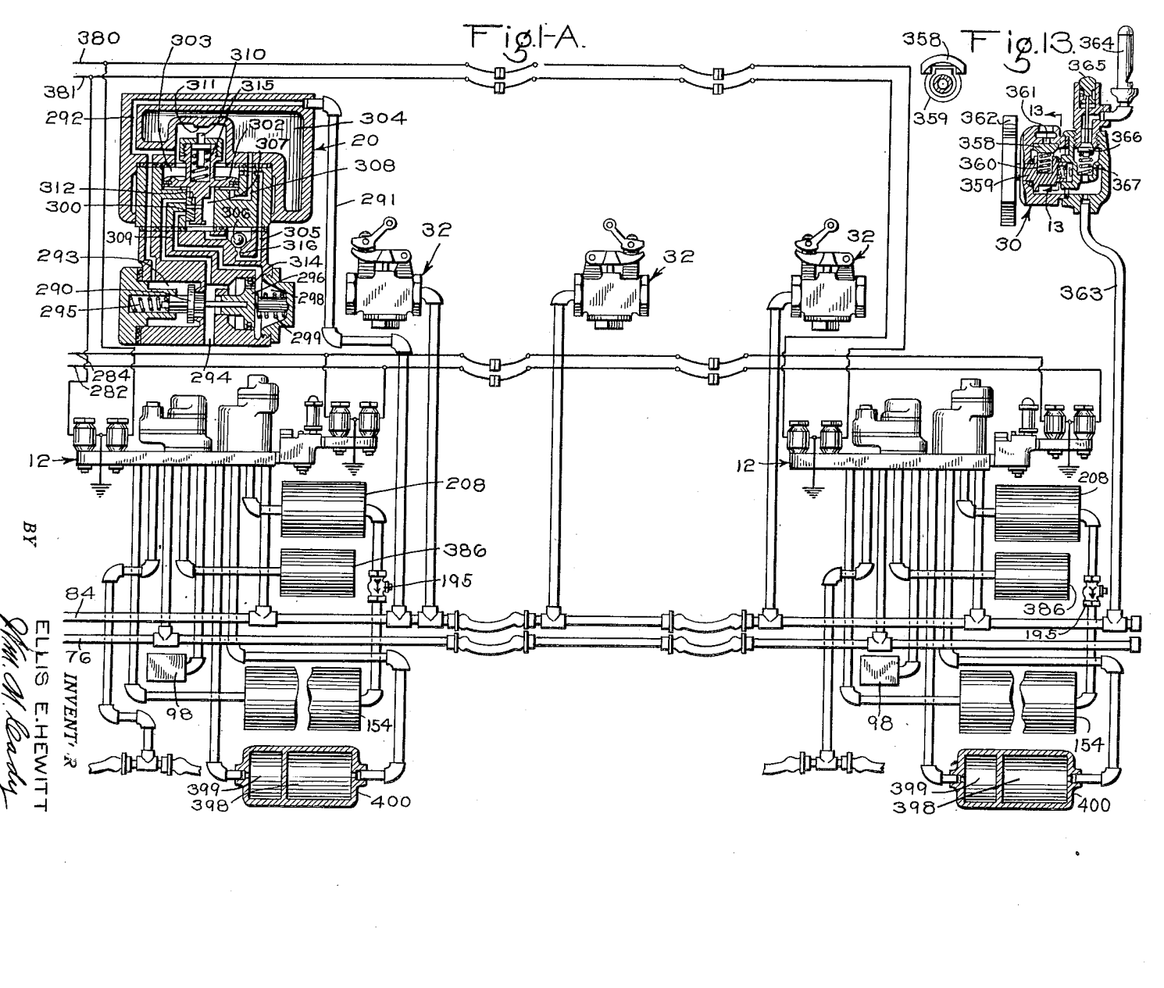

The backing-up valve and whistle device 30 is embodied in a casing provided with a segmental valve 358 carried by a hub portion 359, and urged outwardly by a spring 360 against a seat having an exhaust port 361.

The segmental valve 358 is adapted to be rotated upon its seat by a hand wheel 362. In release position, the segmental valve 358 blanks the exhaust port 361, and in application position uncovers the exhaust port to release fluid under pressure from the brake pipe to the atmosphere, by way of pipe 363.

The backing-up valve and whistle device is also provided with a whistle 364, which is adapted to be operated upon depressing a button 365, which when depressed unseats a whistle valve 366, against resistance of a seating spring 367. Unseating of the valve 366 permits fluid under pressure to flow from the brake pipe past the unseated whistle valve to the whistle 364.

Each of the conductor's valve devices 32 is provided with a valve 370, which is adapted to release fluid under pressure from the brake pipe to the atmosphere, by way of pipe 371 and port 372.

The valve 370 is urged toward seated position by a spring 373, and to unseated position by operation of a lever 374, which when actuated in a given manner operates a second lever 375 to unseat the valve.

The operation of this embodiment of my invention is as follows:

When the train is running, the operator maintains the brake valve handle 66 in "Release" position, which is that shown in Fig. 4. In this position the rotary valve 80 maintains the brake pipe 84 in communication with the main reservoir 83, through pipe indicated at 81 and 82 in Fig. 3. A substantially constant pressure is maintained in the brake pipe by action of a feed valve device 378, which may be of any of the usual type commonly used for this purpose.

At the same time, movable contact 40 is held in engagement with stationary contact 34, so as to maintain energized the electro-magnet in each control valve device 12 controlling the release valve 246 (in the left hand magnet valve section), from battery 116, by way of conductor 380 which extends throughout the train.

When energized, these electro-magnets hold the release valves 246 in unseated position, thereby providing local vents in each control valve device for the straight air pipe 76 and the relay valve section piston chambers 198. The relay valve pistons 196 are then maintained in their lowermost position, so that release pilot valves 178 are held unseated to insure that all fluid pressure in the brake cylinders is released to the atmosphere.

With pressure in the brake pipe maintained at a normal value, piston 204 in the triple valve section of each control valve device 12 is maintained in its lowermost or release position. In this position the connected auxiliary reservoir 208 is charged from the brake pipe by way of a feed groove 382 in the triple valve piston chamber 205, and pipe and passage 209. The connected supply reservoir 154 is also charged from the brake pipe through the triple valve section, past ball check valve 384, and through passage 385 and pipe 155.

In a similar manner, a sanding reservoir 386 connected to each control valve device 12 is charged through a restricted port 387 in the triple valve slide valve 202, by way of passage 388, and pipe 390.

The other parts of each control valve device, as well as the parts of the other apparatus in this embodiment, are positioned as shown in the views already described.

When it is desired to effect a service application of the brakes, the brake valve handle 66 is moved through the zone marked "Electric self-lapping" in Fig. 4, the degree of movement being in accordance with the desired degree of braking. During the movement in this zone, the rotary valve 80 maintains the brake pipe connected to the main reservoir.

When the brake valve handle 66 is rotated, cam 62 causes the rounded end 60 of the operating lever 48 to be raised, the lever fulcruming about the pivot point 50 to cause movable contact 40 to disengage from stationary contact 34 by downward movement of the right end of the contact carrying member 39. The electro-magnets controlling the release valves 246 are then deenergized and the release valves are seated by their springs, thus cutting off the local vents to the atmosphere.

Thereafter the left end of the member 39 moves downwardly against resistance of spring 70 until movable contact 42 has engaged stationary contact 36. When this takes place, the electro-magnet in each control valve device 12 controlling the application valve 240 (in the left hand magnet valve section) is energized from the battery 116, through a conductor 381 which extends throughout the train.

Energization of these electro-magnets causes unseating of the application valves 240, and fluid under pressure is supplied from each supply reservoir 154 to the associated relay valve piston chamber 198 and to the straight air pipe 76, through the passages and pipes heretofore described.

Fluid pressure in each relay valve chamber 198, below each piston 196, actuates each piston upwardly to close off communication between the pressure chamber 158 and the atmosphere, and to effect a supply of fluid under pressure from the connected supply reservoir 154 to the pressure chamber 158. Fluid then flows from each pressure chamber to the connected brake cylinders, and the brakes are thus applied in accordance with the build-up of fluid pressure in the brake cylinders.

When the pressure below the piston 196 has reached a predetermined value, it acts upon piston 212, in the inshot valve section 140, to cause seating of the ball valve 217. Thereafter the flow of fluid to the underside of the piston 196 is through the right hand magnet valve section, as heretofore described. The purpose of the inshot valve section is to insure a brake application sufficient to stop the train in case the communication through the magnet valve section is accidentally closed.

When fluid under pressure is supplied from each supply reservoir 154 locally to the straight air pipe 76, from each control valve device 12, it flows through the straight air pipe to the piston chamber 56 in the brake valve device, where it acts upon the piston 54 to move it upwardly against opposition of spring 58. This movement of piston 54 now swings the operating lever 48 about its left end 60, which fulcrums on the cam 62.

Upward movement of the right end of operating lever 48 actuates the guiding member 44 upwardly. Now since spring 70 is heavier than spring 68, the left end of the contact carrying member 39 moves upwardly first to disconnect contact 42 from contact 36.

When this takes place, the application electro-magnet in the left hand magnet valve section, of each control valve device 12, is deenergized, and each application valve 240 is seated by its spring 244, to cut off the supply of fluid under pressure from each supply reservoir 154 to both the straight air pipe and the underside of relay piston 196. The supply of fluid pressure to the underside of each relay piston will then be lapped.

The pressure at which the supply to the relay valve section is lapped depends upon the position of the brake valve handle 66, which determines the heighth of the fulcrum point formed by engagement of the rounded portion 60 of the operating lever 48 with the cam 62. When this fulcrum point is relatively low, a lower pressure acting upon the piston 54 will cause disengagement of movable contact 42 from contact 36.

When this fulcrum point is relatively high, as when the brake valve handle 66 has been moved toward the extreme counter-clockwise end of the "Electric self-lapping" zone, a greater pressure will be required to effect disengagement of the contacts, as an initial load will have been placed on the piston spring 58, which will, of course, have to be exceeded by the pressure on the underface of piston 54.

When the supply below each relay piston 196 has been lapped, the pressure on the upper side of the piston builds up from the pressure chamber 158, through restricted port 391, until the pressures on each side of the piston are substantially equal. When this takes place, the spring 201 urges the piston downwardly toward lap position, until pin 219 engages the upper end of the slot in which it is disposed in the plunger 200.

In lap position of the piston 196, the supply pilot valve 166 is seated by its spring 167, which is heavier than the release pilot valve spring 179. As soon as the supply pilot valve seats, the application valve 150 is seated upon the equalization of pressure in chambers 148 and 152. The supply of fluid to the brake cylinders is then lapped.

It will thus be seen that the electric self-lapping portion of the brake valve device 10 will cause a fluid pressure to be established in the brake cylinders in accordance with the degree of movement of the brake valve handle 66.

If when the brake valve handle 66 is moved to some position in the "Electric self-lapping" zone, a service application of the brakes should fail to result, then the brake valve handle may be moved to the position marked "Pneumatic service".

In "Pneumatic service" position of the brake valve handle, the rotary valve 80 disconnects the brake pipe from the main reservoir, and connects the brake pipe to atmosphere, by way of pipe 88 (see Fig. 3), through a restricted orifice 392 in the rotary valve, to release pressure from the brake pipe to the atmosphere at a service rate. This reduction in brake pipe pressure is transmitted throughout the train so that when a reduction in pressure has taken place in the emergency piston chamber 303, in the brake pipe vent valve device 20, the overbalancing pressure on the underside of piston 302 actuates it upwardly until its stem 310 engages stop 311.

In this position of piston 302, slide valve 300 connects quick action chamber 304 with the atmosphere through the restricted port 312, as before described. Quick action valve 290 is then still held seated by its spring 295, so that for "Pneumatic service" applications there is no local venting of the brake pipe.

The release of fluid pressure from the brake pipe at the brake valve device causes each piston 204 in the triple valve section of each control valve device 12 to move to service position.

In service poistion, the piston 204 moves the slide valve 202 to disconnect passage 256, leading to the straight air pipe 76, from the passage 254, leading to the connected supply reservoir 154, and connects the connected auxiliary reservoir 208 with pasages 216 and 221, through ports 394 in the slide valve, which have now been uncovered by the graduating valve 203 when the piston moved to service position.

Fluid under pressure from the auxiliary reservoir then flows through passage 216 to the upper side of the double check valve 220, forcing the double check valve to lower position, and then flowing to the under face of the relay valve piston 196, past the unseated inshot ball valve 217, as well as by way of the bypass path through the right hand magnet valve section, as before described.

Fluid also flows from the auxiliary reservoir through passage 216 to a large chamber 398 in the volume reservoir 400, and through passage 221 to a small chamber 399 in the same volume reservoir. Pressure in the auxiliary reservoir then finally equalizes to the combined volumes of itself and chambers 398 and 399.

In service position, the slide valve 202 disconnects the sanding reservoir 386 from the auxiliary reservoir 208.

As before, when a predetermined pressure has been supplied to the under side of each relay valve piston 196, the inshot valve piston 212 causes seating of the inshot ball valve 217, for the purpose as before described.

The relay piston 196 operates as before to effect a supply of fluid under pressure to the connected brake cylinders, in accordance with the pressure supplied to its under side.

It will thus be seen that during a "Pneumatic service" application fluid under pressure is supplied to the under side of each relay piston 196 from each connected auxiliary reservoir 208, while in an "Electric self-lapping" application fluid is supplied to the under side of each relay piston from each connected supply reservoir 154, fluid to the brake cylinders being supplied in both cases from the supply reservoirs.

If it is desired to effect a lap condition of the brakes during "Pneumatic service", then the brake valve handle 66 is moved to "Pneumatic lap" position, as shown in Fig. 4. As is obvious from Fig. 3, this cuts off further reduction in brake pipe pressure.

If during a service application of the brakes, a rate of retardation should be reached above that for which the retardation controller device 16 has been set as a limit, the pendulum 260 will compress the light spring 270 to cause disengagement of movable contacts 264 from stationary contact 268. Disengagement of these contacts deenergizes the cut-off electro-magnet in the right hand magnet valve section of each control valve device 12, and each cut-off valve 222 is thereupon seated by its spring 225, to cut off the supply of fluid under pressure to the under side of each relay piston 196, if the electric self-lapping portion of the brake valve device has not already done so.

If the rate of retardation is great enough to cause pendulum 260 to compress the heavy spring 274, movable contact 264 disengages from stationary contact 266, whereupon the release electro-magnet in the right hand magnet valve section, of each control valve device 12, becomes deenergized, and each release valve 228 is unseated to release fluid pressure from the under side of each relay piston 196 to the atmosphere, through the safety valve device, which operates to retain a predetermined pressure in the brake cylinders.

Of course as the rate of retardation diminishes, due to this release of fluid pressure, the pendulum 260 swings back toward neutral position until the release electro-magnets have again been energized, and if more fluid pressure has been released than is necessary, then the cut-off electro-magnets will be again energized to permit fluid under pressure to again be supplied to the under side of each relay piston 196.

The retardation controller device 16 thus functions to limit the rate of retardation which may be produced by a service application of the brakes.

It is to be here pointed out that service applications of the brakes are normally intended to be effected by movement of the brake valve handle 66 through the "Electric self-lapping" zone, and that higher brake cylinder pressures are thus established than when the brake valve handle is moved through the "Pneumatic service" zone. This is accomplished by supplying fluid under pressure from each supply reservoir direct to each relay valve piston chamber for normal service applications, which produces a relatively higher pressure therein, and from each auxiliary reservoir during "Pneumatic service" applications, the auxiliary reservoir equalizing to the volumes of chambers 398 and 399 and therefore producing a relatively lower pressure in each relay valve piston chamber.

While the retardation controller device 16 may control either service application, it is principally intended to control "Electric self-lapping" applications, which produce higher brake cylinder pressures. Its functioning is, nevertheless, independent of the manner in which the service application is made.

When an electropneumatic service application of the brakes is effected in the manner described, the pressure in each supply reservoir 154 is obviously reduced. Since each supply reservoir is charged from the brake pipe through each control valve device a momentary local drop in brake pipe pressure is produced, which tends to cause the triple valve pistons 204 to move to application position if the auxiliary reservoir pressure does not also fall with brake pipe pressure. In order to cause the auxiliary reservoir pressure to also fall, so that pistons 204 will remain in their release position, each of the auxiliary reservoirs 208 is connected to each supply reservoir 154 by way of the one-way check valve device 195. Thus, when supply reservoir pressure is reduced the auxiliary reservoir pressure is reduced with it, so that there is no tendency for the triple valve pistons to move toward application position during the electropneumatic straight air application and thus cause an undesired automatic application.

When it is desired to effect an emergency application of the brakes, the brake valve handle 66 is moved to "Emergency" position as shown in Fig. 4. In this position, the rotary valve 80 connects the brake pipe with the atmosphere through an open port 402, as is diagrammatically indicated in Fig. 3, to release fluid pressure from the brake pipe to the atmosphere at an emergency rate.

As this emergency reduction is transmitted throughout the train, the brake pipe vent valve device 20 functions, as before described, to also locally release fluid pressure from the brake pipe to the atmosphere, so that each triple valve piston 204 is caused to move quickly to emergency position.

In emergency position, each triple valve piston 204 moves its slide valve 202 to blank off communication with the straight air pipe 76, as before done during "Pneumatic service" applications, and to connect the associated auxiliary reservoir 208 with the large chamber 398 only, in the volume reservoir 400, and with the under side of each relay valve piston 196, through the paths as before described.

In emergency position, the slide valve 202 connects the small chamber 399, of the volume reservoir 400, with the atmosphere by way of port 404 in the slide valve and passages 219 and 184.

With each auxiliary reservoir connected to only the large chamber 398, the pressure in the reservoir equalizes to a smaller volume than during "Pneumatic service" application, so that a higher pressure is supplied to the under side of each relay valve piston 196. The relay valve section then functions to supply a correspondingly higher fluid pressure to the connected brake cylinders.

It will, therefore, be obvious that during an emergency application of the brakes, the triple valve section of each control valve device functions to control operation of the relay valve section.

After a predetermined pressure has been supplied to the under side of each relay valve piston 196, the inshot valve piston 212 functions as before as described for a service application.

When an emergency application is effected, each triple valve slide valve 202 connects the associated sanding reservoir 386 with a sanding device 98, by way of pipe 390, passage 388, cavity 408 in the slide valve, passage 409 and pipe 406, so that sand is automatically deposited on the track to increase the adhesion between wheels and rails.

While automatic sanding of the rails is effected on several cars upon an emergency application of the brakes, it may be caused on the head end or front car only by manipulation of the hand lever 102 on the brake valve device. When this lever is actuated upwardly, the sanding ball 106 moves downwardly to unseat sanding valve 90. Unseating of this valve permits fluid under pressure to flow from the main reservoir, through the feed valve device 378, pipe 81, passage 92, past the unseated valve 90, through passage 94, to pipe 96, from whence it flows to the sanding device 98 on the head end car. A double check valve device 410 prevents the flow of fluid to the triple valve section of the control valve device 12 on the head end car.

When an emergency application of the brakes is effected, it is desirable that the power supplied to drive the train be cut off, if this has not already been done. In order to provide for this, I have shown a switch operating cylinder 412 having a piston 414 disposed therein adapted to actuate a plunger 416 to move a handle 418 of a power switch device 420 to "off" position.

The cylinder 412 is connected to the pipe 406, which receives fluid pressure from the sanding reservoir during an emergency application of the brakes, by pipe 421, so that during an emergency application fluid pressure flows to the cylinder 412, to the left of piston 414, to cause the switch device handle 418 to be actuated to "off" position.

When an emergency reduction in brake pipe pressure takes place, spring 288 of the retardation controller operating cylinder 18 actuates the piston 280 to the left to cause lever 279 to act upon plunger 278 to increase the tension on the light spring 270. Therefore, when an emergency application of the brakes is effected, the retardation controller device is at the same time conditioned to provide for a higher rate of retardation, as obviously a higher rate will be required to cause sufficient movement of the pendulum 260 to effect a cutting off of the supply of fluid to the under side of each relay valve piston 196.

If the rate of retardation should exceed that provided for by the additional tension placed on the light spring 270, then the pendulum 260 will compress the light spring until contact 264 has disengaged from stationary contact 268, which effects a cut off of the supply of fluid to the relay valve section. If the rate is high enough to disengage contact 264 from contact 266, then a release of fluid pressure from the brake cylinders will result.

When the train is running, the operator must maintain pressure on the foot pedal 350, of foot valve device 22, or on the push button 110 of the brake valve handle 66. If pressure on both of these is released simultaneously, either by accident or by design, the electro-magnet in the magnet valve device 28 will be deenergized, and its valve 352 will be unseated while the valve 346 in the foot valve device 22 will be also unseated, so that fluid pressure will be released from the chamber 325, in the application valve device 26, to the atmosphere, past the unseated valve 330 in the cut-off valve device 24, and past the unseated valves in the foot valve device 22 and magnet valve device 28.

Release of pressure from chamber 325 permits the overbalancing pressure in chamber 319 to unseat the valve 318, whereupon the brake pipe will be vented to the atmosphere through port 322. This release of pressure from the brake pipe takes place at an emergency rate so that an emergency application of the brakes results, the same as when the brake valve handle 66 is moved to "Emergency" position.

If, however, push button 110 in the brake valve handle is held down, so that the valve 352 will be seated, or if pressure is maintained on the foot pedal 350, so that the valve 346 will be held seated, then the application valve device 26 will be ineffective to produce an emergency application of the brakes.

Also, if the brake valve handle has been moved to a position in the "Electric self-lapping" zone, so that a predetermined pressure is supplied to the straight air pipe 76, then the pressure above diaphragm 336, in cut-off valve device 24, will hold the valve 330 therein seated, so that pressure may be released from both the push button 110 and the foot pedal 350 without causing an emergency application.

If it is desired to effect an emergency application of the brakes from other than the head end of the train, this may be accomplished by pulling the operating lever 374, of one of the conductor's valve devices 32, to the left, to cause unseating of the valve 370 therein. Unseating of this valve releases fluid pressure from the brake pipe to the atmosphere at an emergency rate, so that an emergency application of the brakes results, in the manner heretofore described.

If for any reason the motive power of the train becomes disabled and it becomes necessary to tow the train, the brakes on the train may be operated from a towing vehicle by connecting the brake pipe 84 to the brake pipe of the towing vehicle and placing the brake valve hand 66 in "Pneumatic lap" position. When this is done, the brakes on the train may be operated from the towing vehicle in the usual manner by effecting a reduction in brake pipe pressure.

When the train is backing up, the brakes may be applied from the rear end of the train by operating the backing-up valve device 30. An application of the brakes is effected by rotating the hand wheel 362 so as to cause segmental valve 358 to uncover the exhaust port 361. Fluid pressure is then released from the brake pipe 84 to the atmosphere at a service rate to effect an application of the brakes in a manner similar to that caused by movement of the brake valve handle 66 to "Pneumatic service" position.

When backing up, warning may be given by depressing the push button 365 in the backing-up valve and whistle device 30, so as to cause brake pipe pressure to flow past the then unseated whistle valve 366 to operate the whistle 364.

To release the brakes when backing up, the hand wheel 362 is rotated to cause segmental valve 358 to blank exhaust port 361, whereupon brake pipe pressure is restored from the main reservoir through the brake valve device 10.

In the foregoing description I have described an arrangement whereby for "Pneumatic service" applications fluid pressure is supplied from the auxiliary reservoir through the triple valve section, of each control valve device, to the relay valve section to effect an application of the brakes. Instead of supplying this fluid pressure from the auxiliary reservoir through the triple valve section, I may supply fluid under pressure from the main reservoir to the straight air pipe, by providing an arrangement of ports in the rotary valve 80, of the brake valve device, as is diagrammaticaly indicated in Figs. 6 and 7.

As shown diagrammatically in Fig. 7, the operation of the brake valve device for "Electric self-lapping" and "Release" is the same as described in connection with Fig. 3. However, for "Pneumatic service" the main reservoir is disconnected from the brake pipe and reconnected to a passage 422 leading to the straight air pipe, through a port 424, so that fluid under pressure flows directly from the main reservoir through the straight air pipe, through each triple valve section of each control valve device, to the under side of each relay valve piston 196, to effect an application of the brakes in the same manner as described in connection with "Pneumatic service" applications of the brake valve device of Fig. 2.

An emergency application of the brakes is effected as before, by moving the brake valve handle 66 to "Emergency" position, as shown in Fig. 8. It will thus be seen that in the modified form of brake valve device shown diagrammatically in Figs. 6, 7 and 8, both a straight air and an automatic, as well as an electric self-lapping, application of the brakes may be effected from the one brake valve device.

As before described, the retardation controller device 16 functions to limit the permissible rate of retardation. It may be desirable, however, for the operator to have means for effecting a cutting off and release of fluid pressure supplied to the under side of each relay piston 196, before the retardation controller will have had time to operate. To provide for this I may interpose in the conductors 282 and 284, leading from the retardation controller device to the electro-magnets in the right hand magnet valve section of each control valve device 12, a switch device 426. This switch device may be provided with a movable arm 428 having contacts 429 and 430 thereon and insulated therefrom adapted to open the circuit leading to the electro-magnets.

The arm 428 may be held by a spring 432 in a position to normally close the circuits leading to the electro-magnets, and when the operator desires to operate the cut-off and release valves in each control valve device, he may move the handle 428 to the left to deenergize the cut-off and release electro-magnets. This operation would then produce the same result as when the pendulum 260 of the retardation controller device had caused movable contact 264 to disengage from the stationary contacts 266 and 268.

Figure 14:
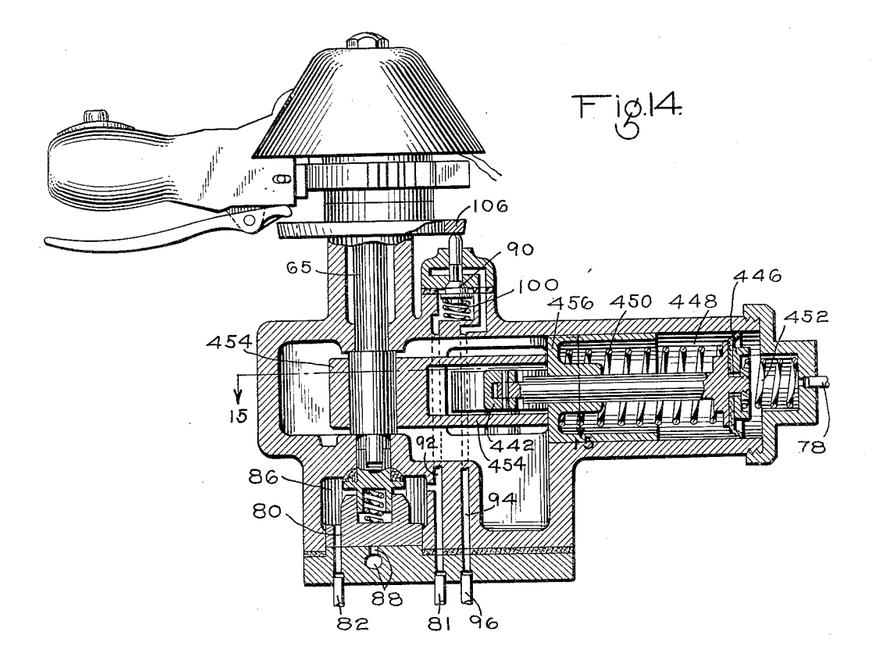
Fig. 14 is a partial diagrammatic view of another form of brake valve device which may be used in place of that shown in Fig. 2.
Figure 15:
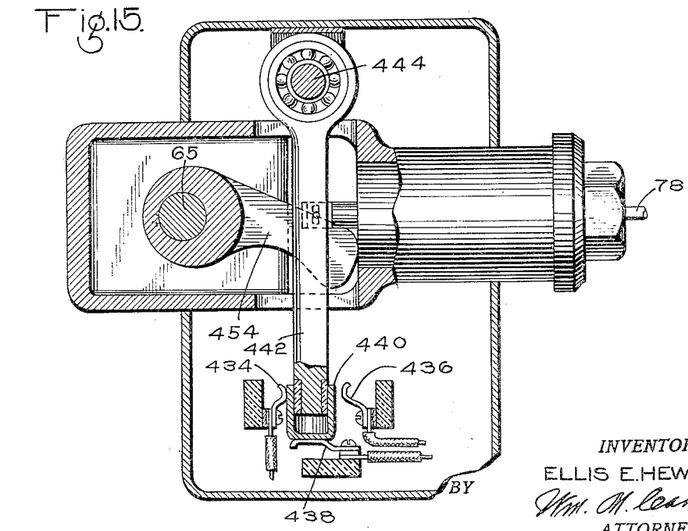
Fig. 15 is a partial sectional view taken along the line 15—15 of Fig. 14.

In addition to the brake valve device shown and described in connection with Figs. 2, 3, 4, and 5, and the modifications referred to in Figs. 6, 7 and 8, I may use a brake valve device of the type and construction shown in Figs. 14 and 15.

In this brake valve device I have indicated by like numerals the parts which are essentially the same as those shown in Fig. 2. The principal difference between this brake valve device and that of Fig. 2 is in the electric self-lapping portion.

A stationary contact 434, corresponding to the stationary contact 34 in the other brake valve device, is provided for controlling the release valve 246 in the left hand magnet valve section of each control valve device 12, and another stationary contact 436, corresponding to the stationary contact 36 in the other brake valve device, is provided for controlling operation of the supply valve 240 in each control valve device.

A third stationary contact 438, which connects with battery 116, is provided corresponding to the two movable contacts 40 and 42 of the other brake valve device, and is adapted to be inconstant engagement with a U-shaped contact member 440 carried by an arm 442 having one end pivotally mounted through a frictionless bearing at 444.

The arm 442 is adapted to be actuated back and forth by a piston 446 disposed in a piston chamber 448, which is connected to the straight air pipe by the aforementioned pipe 78. The piston 446 is urged toward the right by a spring 450.

A second spring 452 urges the piston 446 to the left, so that the U-shaped contact member 440 is urged into contact with stationary contact 434 when the brake valve handle is in release position.

When it is desired to effect a service application of the brakes, the brake valve handle is moved through the "Electric self-lapping" zone, as before. When the brake valve handle is moved in the "Electric self-lapping" zone, a cam 454 secured to the operating shaft 65, acts upon a movable abutment 456 to urge the piston 446, through spring 450, to its extreme position to the right. This movement of the piston swings arm 442 to the right to cause contact 440 to disengage from stationary contact 434, to cause seating of each release valve 246, and to engage stationary contact 436.

Engagement with contact 436 causes unseating of the supply valve 240 in each control valve device, to effect a supply of fluid under pressure to both the straight air pipe and each relay valve piston 196.

When fluid under pressure in the straight air pipe flows to the piston chamber 448, it acts upon piston 446 to overcome the pressure exerted by spring 450. When the pressure exerted by spring 450 is overcome, the arm 442 is swung to the left to cause disengagement of movable contact 440 from stationary contact 436, to effect a lapping of the supply of fluid to the brake cylinders. This form of brake valve device, therefore, performs the same functions as that shown in Fig. 2, but through a somewhat different arrangement of parts.

While I have shown one principal embodiment of my invention, and several modifications of component parts thereof, it is to be understood that I do not intend to be limited to either the specific apparatus shown, or the particular arrangement illustrated, nor otherwise than by the spirit and scope of the appended claims.

Having now described my invention, what I claim as new and desire to secure by Letters Patent, is:

1. In a railway train brake system, the combination with brake cylinders for one or more units in the train, of valve means for controlling the supply of fluid under pressure to and its release from said brake cylinders, means for effecting operation of said valve means either electro-pneumatically or pneumatically, a brake valve device for manually controlling said last means, and retardation controlling means for limiting the rate of retardation due to the supply of fluid under pressure to said brake cylinders and providing for a higher rate during pneumatic operation of said valve means than during electro-pneumatic operation.

2. In a railway train brake apparatus, the combination with a brake cylinder, of a control valve device operable to effect a supply of fluid under pressure to said brake cylinder and having a normally energized cut-off and release magnet valve section operable when deenergized to effect a cutting off and release of fluid under pressure supplied to said brake cylinder, a retardation controller device adapted to deenergize said magnet valve section at a certain rate of retardation, and manually operated means for deenergizing said magnet valve section at will.

3. In a railway train having two or more cars, a brake system comprising in combination, at least one brake cylinder for each car in the train, a main reservoir for the head end car, supply reservoirs for two or more cars in the train, control valve devices for two or more cars in the train for controlling the supply of fluid under pressure from the supply reservoirs to the brake cylinders, said control valve devices having electrically operated application and release valves, a brake control device having contacts for controlling said application and release valves, said contacts being biased to a release position, said brake control device having a control element operable in a first zone and a second zone, a straight air pipe, means responsive to movement of said control element in said first zone for actuating said contacts to application position to effect operation of said application and release valves to cause fluid under pressure to be supplied to said brake cylinders and to said straight air pipe, means responsive to pressure in said straight air pipe for subsequently operating said contacts to lap position at a pressure corresponding to the degree of movement of said control element in said first zone, and means operated upon movement of said control element in said second zone for supplying fluid under pressure from said main reservoir to said straight air pipe to cause said control valve devices to also supply fluid under pressure to said brake cylinders.

4. In a train braking system, in combination, a brake cylinder, a straight air pipe, valve means for controlling the supply of fluid under pressure to said brake cylinder and to said straight air pipe, electroresponsive valve means for effecting a supply of fluid under pressure to operate said first valve means, a brake valve device having a control handle operable to different positions to effect operation of said electroresponsive valve means, means responsive to pressure in said straight air pipe for causing said brake valve device to effect a lap of the fluid supplied to operate said first valve means according to the degree of movement of said handle, a retardation controller device, and means governed by operation of said retardation controller device at a chosen rate of retardation for preventing further supply to said first valve means and for decreasing the pressure of fluid supplied thereto to effect a release of fluid under pressure from said brake cylinder.

5. In a train braking apparatus, in combination, a brake cylinder; a control valve device having a relay valve section, a normally energized release magnet valve device, a normally deenergized application magnet valve device, a normally energized cut-off magnet valve device, and a second normally energized release magnet valve device; said application and first release magnet valve devices controlling the supply of fluid under pressure to operate said relay valve section, and said cut-off and second release magnet valve devices being operable to cut off the supply to said relay valve section and to release fluid under pressure therefrom; manually operated control means for controlling energization and deenergization of said application and first release magnet valve devices; and a retardation controller device operable at a chosen rate of retardation to deenergize said cut-off and second release magnet valve devices.

6. In a train braking apparatus, in combination, a brake cylinder, a relay valve device for controlling the supply of fluid under pressure to and its release from said brake cylinder, means for establishing a communication through which fluid under pressure is supplied to operate said relay valve device, means for effecting a supply of fluid under pressure through said communication, a normally energized cut-off valve device operable when deenergized to close said communication, a normally energized release valve device operable when deenergized to release fluid under pressure from said relay valve device, circuits for connecting said normally energized valve devices to a source of current supply, normally closed contacts in each of said circuits adapted when opened to open said circuits, inertia operated means for opening certain of said contacts at a chosen rate of retardation, and manually operated means for opening certain other of said contacts at will.

7. In a train braking apparatus, in combination, a brake cylinder, a relay valve device for controlling the supply of fluid under pressure to and its release from said brake cylinder, means for establishing a communication through which fluid under pressure is supplied to operate said relay valve device, a normally energized release valve device controlling a communication between said first communication and the atmosphere, a normally deenergized application valve device for controlling the supply of fluid under pressure to said communication, a brake valve device having contacts for controlling said application and release valve devices, said contacts being movable manually to application position, said brake valve device having fluid pressure means for actuating said contacts to lap position, a straight air pipe for connecting said first communication to said fluid pressure means for supplying fluid under pressure to actuate said contacts to lap position, a normally energized cut-off and release valve means interposed in said communication between said first mentioned application and release valve devices and said relay valve device and operable when deenergized to cut off the supply of fluid under pressure to said relay valve device and to diminish the pressure of fluid supplied thereto, circuits for connecting said cut-off and release valve means to a source of current supply, normally closed contacts in said circuits, and an inertia operated device for opening said contacts at a chosen rate of retardation.

8. In a train braking apparatus, in combination, a brake cylinder, a relay valve device operated upon an increase in pressure for supplying fluid under pressure to said brake cylinder and operated upon a decrease in pressure for releasing fluid under pressure from said brake cylinder, means for establishing a communication through which fluid under pressure is supplied to operate said relay valve device, application and release magnet valve devices at one end of said communication operable to control the supply of fluid under pressure to and its release from that end, a cut-off valve device in said communication between said application and release magnet valve devices and said relay valve device and operable to cut off the supply of fluid under pressure to said relay valve device, a second release valve device in said communication between said cut-off valve device and said relay valve device and operable to release fluid under pressure from said relay valve device when said cut-off valve device is closed, means for controlling operation of said application and release magnet valve devices at will, and means operated according to the rate of retardation produced by an application of the brakes for controlling said cut-off and release valve means.

9. In a train braking apparatus, in combination, a brake cylinder, a relay valve device for controlling the supply of fluid under pressure to and its release from said brake cylinder, a casing provided with a communication through which fluid under pressure is supplied to operate said valve device, application and release magnet valve devices attached to said casing and disposed at one end of said communication for controlling the supply of fluid under pressure to and its release from that end, means for controlling operation of said magnet valve devices at will, cut-off and release magnet valve means also attached to said casing and disposed in said communication between said magnet valve devices and said relay valve device and operable to cut off the supply of fluid under pressure to said relay valve device and to diminish the pressure of fluid supplied thereto, means for establishing a by-pass communication around said cut-off valve device, and a valve device operated upon an increase in pressure for closing said by-pass communication.

10. In a train braking apparatus, in combination, a brake cylinder, a relay valve device for controlling the supply of fluid under pressure to and its release from said brake cylinder, a casing provided with a communication through which fluid under pressure is supplied to operate said valve device, application and release magnet valve devices attached to said casing and disposed at one end of said communication for controlling the supply of fluid under pressure to and its release from that end, means for controlling operation of said magnet valve devices at will, cut-off and release magnet valve means also attached to said casing and disposed in said communication between said magnet valve devices and said relay valve device and operable to cut off the supply of fluid under pressure to said relay valve device and to diminish the pressure of fluid supplied thereto, means for establishing a by-pass communication around said cut-off valve device, a valve device operated upon an increase in pressure for closing said by-pass communication, and means for preventing a release of fluid under pressure from said relay valve device by operation of said cut-off and release valve means below a predetermined pressure.

11. In a train braking apparatus, in combination, a brake cylinder, a relay valve device for controlling the supply of fluid under pressure to and its release from said brake cylinder, a casing provided with a communication through which fluid under pressure is supplied to operate said relay valve device, a brake valve device having contacts operable to application position according to movement of a control element, magnet valve means attached to said casing and responsive to movement of said contacts to application position for effecting a supply of fluid under pressure to said communication, a straight air pipe adapted to be connected to said communication and to have fluid under pressure supplied thereto from said communication corresponding to that supplied to operate said relay valve section, means responsive to a predetermined degree of fluid under pressure in said straight air pipe for actuating said contacts to lap position, a brake pipe, and an automatic valve device controlling connection of said straight air pipe to said communication and operated upon a reduction in brake pipe pressure for disconnecting said straight air pipe from said communication and for effecting another supply of fluid under pressure to said communication.

12. In a train braking apparatus, in combination, a brake cylinder, a relay valve device for controlling the supply of fluid under pressure to and its release from said brake cylinder, means for establishing a communication through which fluid under pressure is supplied to operate said relay valve device, a brake valve device having contacts movable to application position according to movement of a control handle, means responsive to movement of said contacts to application position for effecting a supply of fluid under pressure through said communication, a straight air pipe connecting with said communication and adapted to have fluid under pressure supplied thereto from said communication to a degree corresponding to that supplied to operate said relay valve device, means responsive to a predetermined degree of fluid under pressure in said straight air pipe for actuating said contacts to lap position, a brake pipe, and automatic valve device operated upon a reduction in brake pipe pressure for also effecting a supply of fluid under pressure through said communication, and means effective upon operation of said automatic valve device for preventing operation of said contacts to lap position.

13. In a train braking apparatus, in combination, a brake cylinder, a relay valve device for controlling the supply of fluid under pressure to and its release from said brake cylinder, means for establishing a communication through which fluid under pressure is supplied to operate said relay valve device, means for effecting a supply of fluid under pressure to said communication by straight air operation, means for effecting a supply of fluid under pressure to said communication by automatic operation, valve means for selecting between the supply by straight air operation and the supply by automatic operation, a normally energized cut-off valve device operable when deenergized to cut off the supply by either operation, a normally energized release valve device operable when deenergized to release fluid under pressure from said communication, circuits for connecting said last two valve devices to a source of current supply, normally closed contacts in said circuits, and an inertia operated device operable at a chosen rate of retardation for opening said contacts.

14. In a train braking apparatus, in combination, a brake cylinder, a relay valve device for controlling the supply of fluid under pressure to and its release from said brake cylinder, means for establishing a communication through which fluid under pressure is supplied to operate said relay valve device, a volume reservoir having two chambers, a brake pipe, and an automatic valve device operated upon a service reduction in brake pipe pressure for effecting a supply of fluid under pressure to said communication and to both of said chambers and operated upon an emergency reduction in brake pipe pressure for effecting a supply of fluid under pressure to said communication and to one of said chambers.

15. In a train braking apparatus, in combination, a brake cylinder, means for effecting a supply of fluid under pressure to said brake cylinder, a retardation controller device having normally closed contacts and a body operable at a chosen rate of retardation to open said contacts, means responsive to opening of said contacts for effecting a reelase of fluid under pressure from said brake cylinder, a brake pipe, and means operated upon an emergency reduction in brake pipe pressure for causing said contacts to be opened at a higher rate of retardation than said chosen rate.

16. In a train brake system, in combination, a brake cylinder, a brake pipe, a sanding device for sanding the rails, a retardation controller device having normally closed contacts adapted to be opened at a chosen rate of retardation, means responsive to opening of said contacts for controlling the release of fluid under pressure from said brake cylinder, fluid pressure means for conditioning said retardation controller to open said contacts at a higher rate of retardation, and an automatic valve device operated upon a service reduction in brake pipe pressure for effecting a supply of fluid under pressure to said brake cylinder and operated upon an emergency reduction in brake pipe pressure for effecting a supply of fluid under pressure to said brake cylinder and to said last means to cause said retardation controller to be set for said higher rate of retardation and to effect operation of said sanding device, whereby a higher rate of retardation is permitted and maintainable during emergency applications of the brakes than during service applications.

17. In a vehicle brake system, in combination, a brake cylinder, a release valve subject on one side to pressure from a pressure chamber and on the other side to combination pressure from a spring and from a valve chamber, means for establishing a communication between said valve chamber and the atmosphere, a normally open pilot valve controlling opening and closing of said communication, a piston having a release position and being adapted to be operated to an application position, and levers associated with said piston for operating said pilot valve when said piston is actuated to application position, said release valve being adapted to be held in seated position when said pilot valve is closed and to be unseated by fluid under pressure from said pressure chamber when said pilot valve is opened.

18. In a vehicle brake system, in combination, a brake cylinder, a supply valve subject on one side to pressure from a supply chamber and on the other side to combined pressure from a spring and from a valve chamber, a normally seated supply pilot valve operable when unseated to reduce the pressure in said valve chamber, a release valve subject one one side to pressure from a pressure chamber and on the other side to combined pressure from a spring and from a release valve chamber, a normally unseated release pilot valve for controlling reduction of pressure in said release valve chamber, said supply valve being normally held in seated position when said supply pilot valve is seated and said release valve being held seated when said release pilot valve is seated, a piston having a release position and being adapted to be operated to an application position, and means operated by said piston for first seating said release pilot valve and for subsequently unseating said supply pilot valve.

19. In a railway train brake system, the combination with means for effecting an application of the brakes by electropneumatic operation or by pneumatic operation, of retardation controlling means for limiting the rate of retardation of the train due to application of the brakes, and automatic means for adjusting the retardation controlling means so that it limits the rate of retardation of the train to a higher rate during said pneumatic operation than during said electropneumatic operation.

20. In a train brake system, in combination, a brake means, means for effecting an application operation of said brake means to produce a braking effect on the train, a retardation controller device normally adjusted to limit the rate of retardation of the train to a chosen rate, means controlled by said retardation controller device for controlling said brake means, a normally charged pipe, and means operated upon reduction of pressure in said pipe at an emergency rate for adjusting said retardation controller device to limit the rate of retardation of the train to a rate higher than said chosen rate.

21. In a vehicle brake system, in combination, an auxiliary reservoir, a supply reservoir, automatic means for effecting an automatic application of the brakes by supply of fluid under pressure from said auxiliary reservoir, straight air means for effecting a straight air application of the brakes by supply of fluid under pressure from said supply reservoir, and means connecting said two reservoirs and providing for the decrease of pressure in said auxiliary reservoir upon a decrease of pressure in said supply reservoir, whereby to stabilize the operation of the automatic means connected to the auxiliary reservoir.

22. In a vehicle brake system, in combination, a brake pipe, automatic valve means subject to the opposing pressures of fluid in said auxiliary reservoir and in said brake pipe, and operated upon a reduction in brake pipe pressure to supply fluid under pressure from the said auxiliary reservoir to effect an automatic application of the brakes, straight air means operative to supply fluid under pressure from said supply reservoir to effect a straight air application of the brakes, means for charging said supply reservoir from said brake pipe and being so arranged as to permit a decrease in brake pipe pressure upon a sudden decrease of pressure in said supply reservoir, and means interconnecting said two reservoirs to cause the pressure in said auxiliary reservoir to decrease upon decrease of pressure in said supply reservoir, whereby to inhibit the operation of said automatic valve means upon a decrease in brake pipe pressure caused by a decrease in pressure in said supply reservoir.

ELLIS E. HEWITT.